UNITED STATES PATENT OFFICE.

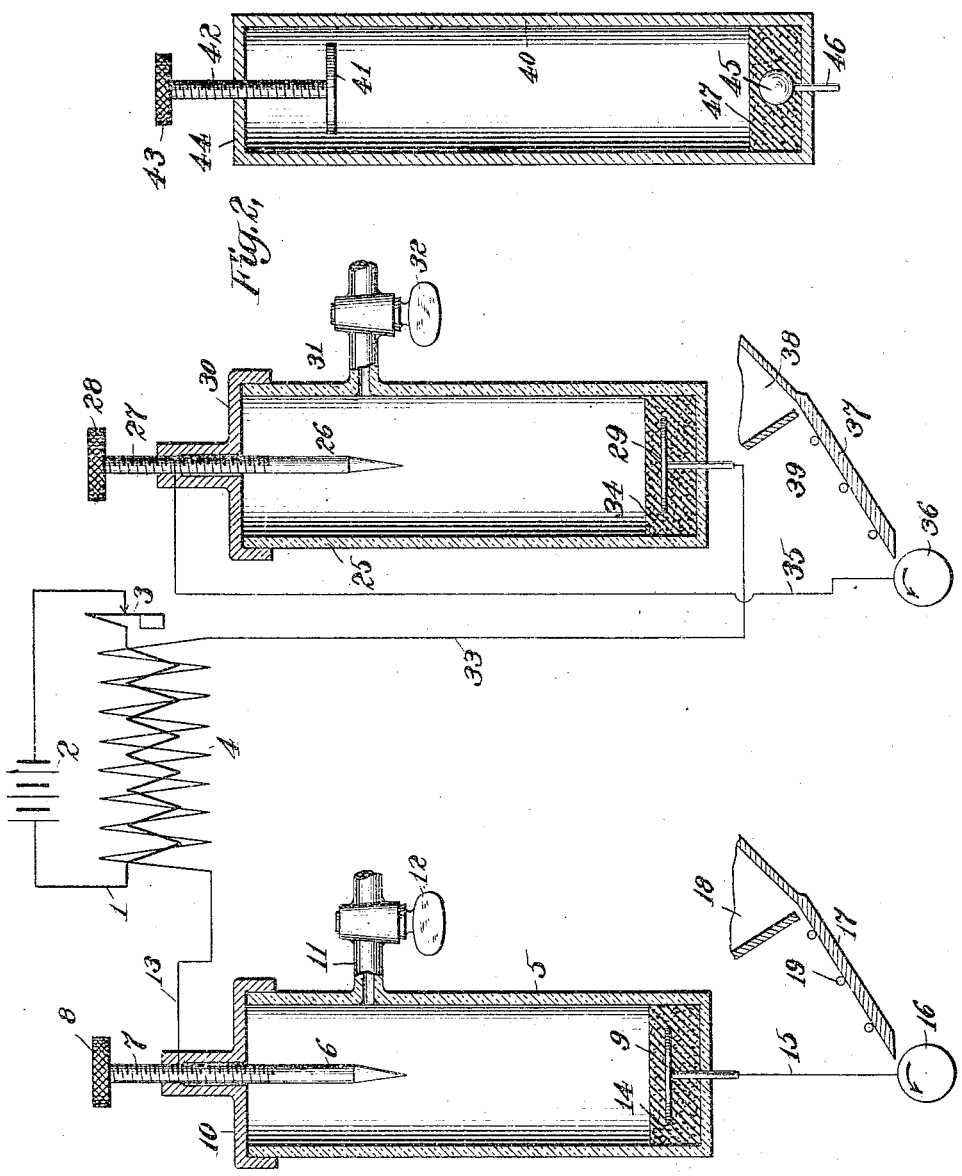

LUCIEN I. BLAKE, OF LAWRENCE, KANSAS.

ELECTROSTATIC APPARATUS.

No. 817,746.

Specification of Letters Patent.

Patented April 17, 1906.

Application filed January 23, 1905. Serial No. 242,235.

*To all whom it may concern:*

Be it known that I, LUCIEN I. BLAKE, a citizen of the United States, and a resident of Lawrence, in the county of Douglas and State of Kansas, have invented certain new and useful Improvements in Electrostatic Apparatus, of which the following is a specification, taken in connection with the accompanying drawings, which form a part of the same.

This invention relates to electrostatic apparatus, and relates especially to apparatus for producing continuous unidirectional electrostatic discharges from induction-coils, transformers, or other sources of high-potential electricity having varying potential.

In the accompanying drawings, in which the same reference-numeral refers to similar parts in both figures, Figure 1 is a sectional diagrammatic view of an embodiment of this invention. Fig. 2 is a sectional view of a modified construction.

In the illustrated embodiment of this invention the primary winding 1 of an induction-coil is indicated as connected with the battery or other source of electricity 2 and as being in circuit with a suitable break 3, so that intermittent electrical impulses of high potential and varying direction are produced in the secondary winding 4 of this induction-coil. In order to utilize these alternating electrical impulses for some electrostatic work, suitable convectors may be connected to the coil-terminals for the purpose of rendering the high-potential electricity unidirectional.

As indicated in the drawings, the convector may comprise a casing 5, preferably of glass or similar insulating material provided with a suitable cap 10, which preferably entirely closes the casing and forms an air-tight chamber. If desired, the vacuum connection 11 in the form of a tube or otherwise may be secured to the casing and provided with a valve 12, this pipe leading to a suitable air-pump for producing the desired pressure within the casing.

The electrodes are mounted within the casing and preferably are adjustable in position, so that they can be maintained at such distance apart that disruptive discharges cannot take place and so that the amount of convective discharge between them can be suitably regulated. The exposed electrode may have any desired form to allow the convective discharges to take place. The exposed electrode 6 is indicated in Fig. 1 as being a sharp or pointed electrode, and its stem 7 is preferably threaded, so as to engage a threaded opening in the cap 10, and thus accurately adjust the position of this electrode 6 by turning the nut 8. The other electrode 9 may be of any desired shape and may have the plate form indicated. This electrode is preferably embedded in suitable cover material 14, this cover being preferably composed of suitable sized particles of insulating material—such, for instance, as powdered silica.

The convector is indicated as operating in connection with an electrostatic separator which comprises the rotating drum 16, located adjacent the discharge end of the feed-board 17. Powdered material is supplied by the hopper 18, this material being regularly fed down the board by the reciprocating feeders 19, and thus discharge in a regular stream on the electrified drum, this separating apparatus being constructed and operating in a generally similar manner to what is described in the United States Patent No. 701,417, granted June 3, 1902. In this manner the alternating high-potential electricity from the secondary winding 4 of the induction-coil passes over the connection 13 and is discharged convectively from the electrode 6. This electricity is thus supplied in quite a regular manner to the covered electrode 9, which is electrically connected by the wire or other connection 15 with the drum 16. This separator-drum is thus maintained at a substantially uniform electrical potential which may be adjusted by suitably regulating the distance between the two convector-electrodes within the casing, a greater separator of course diminishing the potential of the drum or other utilizing device.

The regulation of the potential of the electrode 9 and the drum or other utilizing device and also the amount of electricity supplied will be effected to some extent by regulating the pressure of air or other gas within the convector-casing. The vacuum connection allows this to be done, the reduction of pressure in the convector-casing promoting the convective discharge between the electrodes so long as a moderate pressure is maintained. If desired, however, the convector-casing may have an open connection with the atmosphere which can be effected by suitably opening the valve 12 or otherwise.

If desired, a similar convector may be used in connection with the other secondary electrode of the induction-coil. The convector-casing 25 is similarly formed and is provided with a similar vacuum connection 31, having the valve 32 therein. The exposed electrode 26 is indicated in this instance as pointed and is provided with the threaded stem 27 and the adjusting-nut 28, so as to adjust the position of the electrode 26 with respect to the cover 30 and the other electrode 29. This plate-electrode 29 is indicated as located within the covering material 34 and as being electrically connected with the secondary terminal of the induction-coil by the connection 33. The drum 36 of the electrostatic separator is connected in this instance by the insulated wire 35 with the exposed electrode 23. The separator is in this instance similarly constructed and comprises the inclined feed-board 37, the hopper 38, and the cords or similar feeding elements 39. This drum 36 can be maintained at a substantially constant electrical potential, and this potential, which is opposite in sign from that possessed by the drum 16, can be suitably regulated by the adjustment of the electrode 26 or by the adjustment of the pressure within the convector-casing. The exposed convector-electrodes, especially if pointed, tend to discharge positive electricity.

If desired, the casing 40 (indicated in Fig. 2 may be given the substantially closed form) and the exposed electrode may be given any desired form and may have a considerable area, the electrode 41 being indicated as having a plate form, although, of course, a ball or other shaped electrode may be used. The stem 42 of this electrode is indicated as threaded, so that the position of the electrode within the casing may be adjusted by turning the nut 43. The covered electrode 45 is indicated in this case as having a substantially spherical form and is embedded in insulating material which has been reduced to particles of the desired size, and indeed in some cases the casing may be horizontally arranged and both electrodes covered or embedded, substantially as described. This covered electrode is connected with the wire or other conductor 46, the other terminal of the convector being suitably connected with the stem 42 of the exposed electrode.

It is of course understood by those familiar with this art that many changes may be made in the form, size, proportion, and numbers of parts of this apparatus, parts of the same may be used alone, and parts may be used in connection with other devices without departing from the spirit of this invention or losing the advantages of the same. I do not, therefore, desire to be limited to the details of the disclosure which has been made in this case; but what I claim as new and what I desire to secure by Letters Patent is set forth in the appended claims.

I claim—

1. In electrostatic apparatus, an induction-coil producing alternating high-potential impulses in its secondary winding and a convector comprising a casing a covered electrode and an exposed point-electrode within said casing and having a screw adjustment, one of said electrodes being connected to a terminal of said induction-coil.

2. In electrostatic apparatus, an air-tight convector-casing, a valved vacuum connection upon said casing, a covered electrode in said casing embedded in particles of insulating material and an adjustable exposed point-electrode in said casing.

3. In electrostatic apparatus, a casing, a covered electrode in said casing embedded in particles of insulating material and a coöperating exposed point-electrode adjustably mounted in said casing.

4. In electrostatic apparatus, a casing, a covered electrode within said casing and a coöperating exposed electrode adjustably mounted in said casing.

5. In electrostatic apparatus, a covered electrode and a coöperating exposed electrode.

6. In an electrostatic apparatus, a source of alternating high-potential electricity and means to allow the convective discharge of said electricity to produce unidirectional electric discharges.

7. In electrostatic apparatus, a source of high-potential electricity having a varying potential and means to allow the convective discharge of said electricity to produce unidirectional discharges of substantially uniform tension.

LUCIEN I. BLAKE.

Witnesses:
W. S. HEITZMON,
A. F. HENDRIX.